May 6, 1952 A. E. CHELGREN 2,595,764

HIGH-FREQUENCY RESONANT CIRCUIT

Filed Feb. 28, 1950

ARVID E. CHELGREN
*INVENTOR.*

BY Francis W. Crotty

HIS ATTORNEY

Patented May 6, 1952

2,595,764

UNITED STATES PATENT OFFICE 2,595,764

HIGH-FREQUENCY RESONANT CIRCUIT

Arvid E. Chelgren, Elmhurst, Ill., assignor to Zenith Radio Corporation, a corporation of Illinois Application February 28, 1950, Serial No. 146,845

8 Claims. (Cl. 250—40)

This invention relates to an improved resonant circuit and more particularly to a circuit which is resonant at high frequencies, being continuously tunable over a wide frequency range. As used throughout the specification, the term "high frequency" refers to frequencies in excess of 100 mcs. (megacycles per second) and the term "wide frequency range" refers to a range of frequencies extending for at least one-half of the lowest frequency in the range.

It is expected that frequency allocations for television service will be established in the range of frequencies from approximately 500 mcs. to 1000 mcs. and in all probabilities, the high-frequency television channels contemplated will occupy a total range of 252 mcs. To construct the frequency-determining circuits for a receiver operable on these channels poses problems of cost and physical size.

It is generally understood that the usual type of resonant circuit comprising a lumped inductance and a lumped capacitance is inoperative at frequencies within the contemplated television range. At these high frequencies the parallel-line or the coaxial-line types of resonant circuits may be suitable but they are costly to fabricate, and, if employed, they may introduce excessively high production costs for the receiver. Moreover, in order to preserve the selectivity and general performance by maintaining the circuit Q at a high value, these resonant-line sections must be physically large which may be undesirable in view of current trends to reduce the overall dimensions of receivers.

It is an object of this invention, therefore, to provide a resonant circuit which is tunable over a range of high frequencies, is small in size, and yet is efficient in operation.

It is a further object of this invention to provide a resonant circuit that is continuously tunable over a range of high frequencies and is simple and inexpensive to construct.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figures 1, 2, 3, 4, 5, 6:
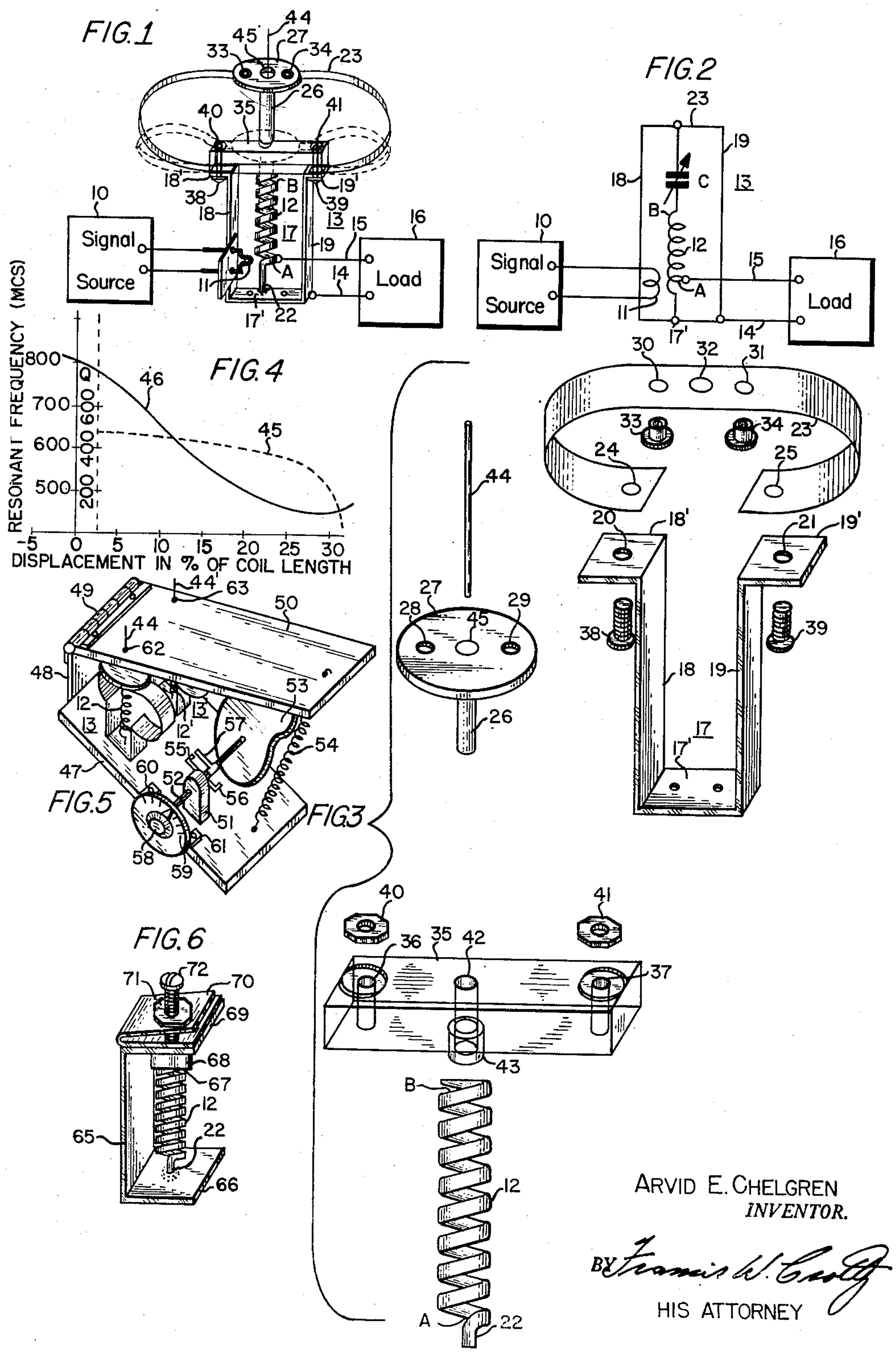
Fig. 1 is an oblique view of a resonant circuit, embodying the present invention, coupled to a signal source and to a load which are shown in block representation.
Fig. 2 represents the electrical equivalent of the circuit of Fig. 1.
Fig. 3 is an enlarged, exploded view showing the structural details of the resonant circuit of Fig. 1.

Fig. 4 comprises curves which are representative of certain performance characteristics of the resonant circuit of Fig. 1;

Fig. 5 is an oblique view of a particular tuning arrangement utilizing the present invention; and Fig. 6 is an oblique view of a modification of the present invention.

In accordance with the present invention, a high-frequency resonant circuit which is continuously tunable over a wide frequency range comprises a supporting frame of conductive material. A plurality of turns of a flat conductive ribbon define a cylindrical coil which has a wall thickness corresponding to the thickness of the ribbon. One end portion of the coil is mechanically connected to the frame to support the coil. The opposite end portion of the coil is spaced from the frame by a distance preferably at least equal to one-half the diameter of the coil. The resonant circuit further includes a cylindrical tuning element of conductive material which is supported by the frame in coaxial alignment with the coil for movement into and out of the aforesaid opposite end thereof to constitute therewith a variable condenser. The resonant circuit still further includes a stop element mechanically connected to the frame and disposed for engagement by the tuning element to limit the movement of the tuning element into the coil to a distance not exceeding approximately 30 per cent of the axial length thereof.

Referring now to Fig. 1, a signal source 10 which provides signals having a frequency in excess of 100 mcs. is electrically connected with a primary coil 11, in turn, inductively coupled to a secondary coil 12 which is included in the resonant circuit 13 embodying the present invention. Neglecting for a moment the details of circuit 13, a connection 14 to the lowermost end of coil 12 and a connection 15 to a point A displaced a predetermined number of turns therefrom provide the means for coupling a load 16 to circuit 13. Signal source 10, for example, may be the antenna circuit of a radio receiver which supplies signals having a frequency within the contemplated television range of 500 to 1000 mcs. For this case, load 16 may be the input stage of the receiver. As will be more readily apparent from the following discussion, resonant circuit 13 provides a selective filter between the signal source and the load.

Referring now more particularly to the exploded representation of Fig. 3, the resonant circuit 13 includes a U-shaped supporting frame 17 of conductive material which includes legs 18 and 19 and a bight end 17'. A portion of each of the open end extremities 18' and 19' of the legs 18 and 19 is disposed in a plane normal to the legs. Portions 18' and 19' preferably extend away from one another and are provided with respective screw receiving openings 20 and 21.

The coil 12 is cylindrical in form and is defined by a plurality of turns of a flat conductive ribbon. The turns of the ribbon are "flat wound" as opposed to "edge wound" and hence the wall thickness of the coil corresponds to the thickness of the ribbon. An extension 22 from the bottom end A of the coil 12 projects in a direction parallel to the axis thereof and, as more clearly shown in Fig. 1, is mechanically and electrically connected to the inner portion of the bight 17' of U-shaped frame 17. The body of coil 12 is disposed entirely between the legs of the frame 17 and is spaced therefrom by a distance at least equal to one-half the diameter of the coil. Preferably, this spacing is equal to the coil diameter.

A C-shaped strap 23 of flexible conductive material is electrically and physically connected at each end to the open end extremities 18' and 19' of frame 17 to complete a closed electrical circuit therewith. The ends of strap 23 are provided with openings 24 and 25 which are arranged to register with openings 20 and 21 of member 17.

A cylindrical tuning element 26 of conductive material is electrically and physically connected at one end to a conductive disc 27. Disc 27 includes a pair of rivet-receiving openings 28 and 29 which are arranged to register with a pair of openings 30 and 31 disposed in the body portion of C-shaped member 23 when tuning slug 26 is placed within a central opening 32 positioned between openings 30 and 31. A first rivet 33 which passes through openings 30 and 28 and a second rivet 34 which passes through openings 31 and 29 secure disc 27 to member 23, the rivets being clinched in the usual manner. In order to provide a better electrical connection, the disc may be soldered to member 23. Strap 23 has such a configuration and the openings 30, 31 and 32 are so positioned that slug 26 is supported by the flexible strap 23 in coaxial alignment with coil 12 for movement into and out of the top end B thereof. Hence, the coil and movable member 26 constitute a variable condenser.

A rectangular block 35 of dielectric material is supported at the open end extremity of frame 17 and includes a pair of openings 36 and 37 adapted to register with openings 20 and 21. The member 35 rests on portions 18' and 19' of frame 17 and mechanically closes the open end extremity. A screw 38 passes through openings 20, 24 and 36 and a screw 39 passes through openings 21, 25 and 37. A pair of nuts 40 and 41 cooperate with the screws 38 and 39 to secure mechanically the ends of dielectric member 35 to the extremities 18' and 19' of member 17 with the ends of strap 23 clamped between the block and frame portions 18' and 19'.

Insulator 35 includes a centrally disposed opening 42 which is coaxially aligned with slug 26 and coil 12. This opening provides a guide for the slug along its path of movement into and out of the coil and the upper surface of the block defines a stop element which, through strap 23, engages disc 27. Since the disc 27 and strap 23 are maintained in a unitary structure by rivets 33 and 34, this assembly may be considered as a stop engaging portion projecting from tuning member 26. The size of member 35 in the direction parallel to the movement of slug 26 is arranged so that movement of the tuning element into the coil is limited to a distance not exceeding approximately 30 per cent of the axial length of the coil.

Stop element 35 includes a cylindrical portion 43 projecting downwardly from the bottom thereof. This projection passes into the top turns of coil 12 at B and by properly proportioning the outer diameter of the projection with respect to the internal diameter of the coil a close fit is achieved. Hence, the coil is mechanically connected to element 43 and top support is provided in addition to that at the bottom.

A thrust element 44 composed of a length of a stiff, flexible wire such as piano wire is affixed to disc 27, for example, by soldering in a central opening 45 in the disc. Element 44 serves to couple mechanically the tuning member 26 with a displacing means (Fig. 5). Since the wire is flexible, some degree of latitude is afforded in aligning the means for transmitting motion to the tuning element relative to the path of movement thereof.

The structure 13, just described, constitutes a tunable, parallel-resonant circuit which includes coil 12 and a parallel condenser represented by condenser C of Fig. 2 which illustrates the electrical equivalent of the arrangement of Fig. 1. The electrical connection between the lower end A of coil 12 and condenser C is completed through bight 17' and the parallel paths including legs 18 and 19 of frame 17 and strap 23. When member 26 is in the position shown by full lines in Fig. 1, condenser C has minimum capacity. When the tuning element 26 is displaced to the position shown in dotted lines, wherein the assembly of strap 23 and disc 27 engages stop element 35, maximum capacity is achieved. Hence, the resonant frequency of circuit 13 is dependent upon the physical position of slug 26 relative to coil 12.

In a parallel-resonant system one criterion of a wide frequency range is the minimum capacity of the overall circuit. This feature is inherently exhibited by a circuit constructed in accordance with the invention inasmuch as the minimum capacity of the system is determined, for the greater part, by that existing between the top portion B of the coil and the frame legs 18 and 19 and coil 12 is spaced from frame 17 by a distance at least equal to one-half of its diameter. It should be noted that the dielectric properties of member 35 are material factors in the determination of range and circuit Q. If this member does not have a low power factor the circuit Q is affected adversely. Moreover, if the dielectric constant is not low the minimum capacity of the circuit is high and the resulting frequency range is decreased. The projection 43 of member 35, which provides top support for the coil, is subject to the same conditions. Specifically, the physical length of projection 43 should be limited in accordance with the requirement for low minimum capacity. It follows then that both member 35 and projection 43 should be constructed of a material having a low dielectric constant and a very low power factor.

It is recognized that a variable capacity constituted by a cylindrical coil and a movable conductive member is generally known. This effect has been noted primarily in connection with permeability tuned or loss tuned circuits in which a core is supported for movement within the confines of the coil. Prior to the present invention, there has been no recognition that, by limiting movement of the tuning element to a preselected distance not exceeding 30 per cent of the axial length of the coil, utilizing a coil of flat, conductive ribbon, and achieving a small minimum capacity thereby, a capacitively-tuned resonant circuit tunable over a wide range of high frequencies and having high values of Q for each tuning condition could be produced.

For a more complete understanding of the present invention it may be advantageous to consider a specific application which is operable over a frequency range from 475 mcs. to 800 mcs. The composition and configuration of the several elements of this structure are set forth in the following table.

| Element | Material | Physical Configuration |
|---|---|---|
| Coil 12 | Cold-rolled steel .025 inch thick, .070 inch wide, .0005 inch thick silver plate. | Cylindrical coil .182 inch inside diameter, 7½ "flat wound" turns, .041 inch between adjacent sides of successive turns. |
| Frame 17 | Brass 1/32 inch thick, 3/8 inch wide, .0005 inch thick silver plate. | Legs 18 and 19 1 inch long and spaced 5/8 inch apart. Extensions 18' and 19' ¼ inch long. |
| Strap 23 | .002 sheet brass 3/8 inch wide, .0005 inch thick silver plate. | Length prior to formation of "C"—3¼ inch. |
| Tuning element 26. | Integrally formed of brass. | Element 26–1/8 inch diameter, 7/16 inch long. |
| Disc 27 | .0005 inch thick silver plate. | Disc 27—1/16 inch thick, 5/8 inch diameter. |
| Dielectric member 35. | Polystyrene | 1⅛ inch long, 3/8 inch wide, ¼ inch high. Portion 43—1/8 inch long, .182 inch diameter. |

The Q of the structure just described, as measured at several representative frequencies in the required range, is in excess of 500; Q being defined by the usual relation:

$$Q=\frac{F}{\Delta F}$$

where F is the mean frequency and ΔF is the difference between those frequencies at which one-half the power of the mean frequency is derived. The dash curve 45 of Fig. 4 represents the variations in Q of circuit 13 as a function of the displacement of slug member 26. At an approximate displacement of 30 per cent of the coil length there is a relatively sharp deterioration in Q. The full-line curve 46 represents resonant frequency versus displacement and it will be noted that as the tuning element is inserted progressively farther into the coil the resonant frequency decreases. The rate of frequency change tends to level off in the vicinity of 30 per cent displacement and there is a tendency toward an increase in frequency as the slug is displaced beyond the 30 per cent point. On the basis of these Q and frequency relations, it may be seen that the arrangement of the present invention is useful primarily over a range of displacements up to 30 per cent of the coil length.

It should be noted in connection with Fig. 4, that the zero displacement point represents that position wherein the tip of the tuning element lies in the plane of the top of the coil. Displacement of the slug away from the coil results in an increase in frequency.

Since the resonant circuit 13 of the present invention exhibits a Q in excess of 500 for all frequencies within the operating range, the frequency-acceptance band is narrow. If a wider band of frequencies is required, there must be some form of loading to reduce the circuit Q. For example, at a given center frequency in the operating range in order to translate, with substantially no attenuation, a 4 mcs. band of frequencies, the Q should be of the order of 100. The necessary loading is provided entirely by load 16 (Figs. 1 and 2) by connecting leads 14 and 15 across a suitable portion of the turns of coil 12. A proper impedance match can be achieved for load 16 while at the same time supplying the necessary damping for coil 12. Inasmuch as the damping is accomplished in the useful load, the circuit is much more efficient than one in which damping is provided, for example, by a resistor connected across the winding 12.

From the aforegoing discussion, it is apparent that the resonant circuit of the present invention is tunable over a wide range of high frequencies and maintains good efficiency. Furthermore, since the tuning element moves over a relatively short distance, no sliding contacts are required. This feature in addition to the general structural details afford a resonant circuit which is simple and inexpensive to construct. In view of the dimensions set out above in connection with a particular application of the invention, it is evident that the system is small in size. Moreover, the coil is within the confines of a closed electrical circuit which includes the U-shaped frame and the strap. Thus, an excellent shield is afforded and stray coupling between the system and nearby components is minimized.

Although the coil 12 and the tuning element 26 have been specified as being of cylindrical configuration, it is within the contemplation of the invention to utilize other forms without departing from the scope of the invention. For example, elliptical or rectangular arrangements may be suitably employed. However, in any case the configuration of the coil and the tuning element should be essentially the same.

In Fig. 5, there is shown a pair of resonant circuits 13 and 13' embodying the present invention, supported on a mounting base 47. A bracket 48 extends vertically from one end of the base 47 and supports a hinge 49 at the upper extremity thereof. A lever 50 is affixed to hinge 49 for pivotal movement so that its position may be changed relative to the base 47. A bearing member 51 is mounted on member 47 and supports a shaft 52 for rotation about an axis parallel to the axis of hinge 49. A cam member 53 is supported at one end of shaft 52 for rotation therewith and the underside of lever 50 bears against the cam surface defined by member 53. A spring 54 is coupled between the extremity of the lever 50 which is opposite hinge 49 and base 47 to maintain the lever in engagement with the surface of cam 53.

A pair of stop elements 55 and 56 are supported by bearing member 51 and are arranged to arrest movement of a stop-engaging member 57 supported for rotation with shaft 52. The extremity of shaft 52 which is opposite cam 53 carries a pointer knob 58 which is positioned to traverse the indicator scale of a dial plate 59. Plate 59 is secured to base 47 by a pair of brackets 60 and 61.

Lever 50 is provided with a pair of openings 62 and 63 for receiving the thrust wires 44 and 44′ of resonant circuits 13 and 13′. The thrust wires are adjusted transverse to the plane of lever 50 in order to provide suitable tracking for the resonant circuits 13 and 13′ and are fixed in place. It should be pointed out that further tracking for the circuits may be provided by utilizing slugs of conductive, non-magnetic material adjustably supported for entry into the lower ends of the coils 12 and 12′.

In utilizing the arrangement of Fig. 5, the resonant circuits 13 and 13′ may be suitably coupled, for example, to the mixer circuit and the oscillator circuit, respectively, of a heterodyne type receiver. By manipulating dial 58, cam 53 is rotated to change the position of lever 50 to change the position of the tuning elements of resonant circuits 13 and 13′ and tune the receiver. By constructing cam 53 of a particular configuration, a selected relationship of frequency versus dial position can be established. The stops 55 and 56 which engage member 57, secured to shaft 52, to arrest shaft movement are positioned to restrict the movement of the tuning members in the required operating range of frequencies. Furthermore, stop 55 is arranged to limit the inward movement of the tuning members to a distance of less than one-third the axial length of the coils, the stop system of the resonant circuits, represented by stop element 35, not being utilized.

As pointed out hereinbefore, since each of the coils is contained within its respective frame, sufficient shielding is provided to eliminate substantially the magnetic field from the area surrounding the frame. Some capacitive coupling may exist between circuits 13 and 13′, however, it has been found that the usual difficulties arising from the close proximity of the coils of different circuits of a receiver are avoided by the use of the invention.

In the modified arrangement of Fig. 6 the resonant circuit includes coil 12, which is similar to that described in connection with Figs. 1 through 3, supported by an L-shaped frame comprised of leg portions 65 and 66. The axis of coil 12 is parallel to leg portion 65 and termination 22 of the coil is mechanically connected to leg portion 66. A cylindrical dielectric member which includes portions 67 and 68 is positioned at the end of the coil opposite extension 22. Portion 67 has a diameter approximately equal to the inside diameter of coil 12 and projects within the top turn thereof. Portion 68 has a diameter greater than that of portion 67 to form a shoulder therewith against which the top turn of the coil bears. An extension 69 projects from leg 65 in a direction normal to the plane thereof and is positioned opposite leg 66. The top portion of dielectric member 68 bears against the inside surface of projection 69.

One leg of a U-shaped spring 70 is affixed to the outer surface of element 69 and a threaded nut 71 is affixed to the other leg thereof. Openings (not shown) are provided in both legs of spring 70, extension 69 and dielectric member 67, 68 in registry with the opening (not shown) of nut 71. The opening in member 69 includes threads (not shown) similar to those of nut 71. A screw 72 constructed of a conductive, non-magnetic material is threaded into extension 69 and nut 71 and functions similar to slug 26 of the arrangement of Fig. 1. The spring 70 provides the means for maintaining screw 72 in excellent electrical connection with frame portion 69. Portion 69 and nut 71 are so positioned and arranged that the body portion of screw 72 is limited to movement into the coil 12 to a distance not exceeding approximately 30 per cent of the axial length of the coil. The electrical characteristics and operation of the modified system will be readily understood from the discussion made in connection with the structure of Figs. 1 through 3.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A high-frequency resonant circuit continuously tunable over a frequency range comprising: a supporting frame of conductive material; a plurality of turns of a flat conductive ribbon defining a cylindrical coil having a wall thickness corresponding to the thickness of said ribbon, having one end portion mechanically connected to said frame for supporting said coil, and having an opposite end portion which is spaced from said frame by a distance at least equal to one-half of the diameter of said coil; a cylindrical tuning element of conductive material supported by said frame in coaxial alignment with said coil for movement into and out of said opposite end thereof to constitute therewith a variable condenser; and a stop element mechanically connected to said frame and disposed for engagement by said tuning element to limit the movement of said tuning element into said coil to a distance not exceeding approximately 30 per cent of the axial length of said coil.

2. A high-frequency resonant circuit continuously tunable over a frequency range comprising: a U-shaped supporting frame of conductive material; a plurality of turns of a flat conductive ribbon defining a cylindrical coil having a wall thickness corresponding to the thickness of said ribbon, disposed between the legs of said U-shaped frame with one end portion mechanically connected thereto for supporting said coil, and having an opposite end portion which is spaced from said frame by a distance at least equal to one-half of the diameter of said coil; a cylindrical tuning element of conductive material supported by said frame in coaxial alignment with said coil for movement into and out of said opposite end thereof to constitute therewith a variable condenser; and a stop element mechanically connected to said frame and disposed for engagement by said tuning element to limit the movement of said tuning element into said coil to a distance not exceeding approximately 30 per cent of the axial length of said coil.

3. A high-frequency resonant circuit continuously tunable over a frequency range comprising: a U-shaped supporting frame of conductive material; a plurality of turns of a flat conductive ribbon defining a cylindrical coil having a wall thickness corresponding to the thickness of said ribbon, disposed between the legs of said U-shaped frame with one end portion mechanically connected thereto for supporting said coil, and having an opposite end portion which is spaced from said frame by a distance at least equal to one-half of the diameter of said coil; a strap of flexible conductive material electrically and physically connected to the open-end extremities of said U-shaped frame to complete a closed electrical circuit therewith; a cylindrical tuning element of conductive material supported by said flexible strap in coaxial alignment with said coil for movement into and out of said opposite end thereof to constitute therewith a variable condenser; and a stop element mechanically connected to said frame and disposed for engagement by said tuning element to limit the movement of said tuning element into said coil to a distance not exceeding approximately 30 per cent of the axial length of said coil.

4. A high-frequency resonant circuit continuously tunable over a frequency range comprising: a U-shaped supporting frame of conductive material; a plurality of turns of a flat conductive ribbon defining a cylindrical coil having a wall thickness corresponding to the thickness of said ribbon, disposed between the legs of said U-shaped frame with one end portion mechanically connected thereto for supporting said coil, and having an opposite end portion which is spaced from said frame by a distance at least equal to one-half of the diameter of said coil; a cylindrical tuning element of conductive material supported by said frame in coaxial alignment with said coil for movement into and out of said opposite end thereof to constitute therewith a variable condenser and including a stop-engaging portion projecting therefrom; and a stop element of dielectric material supported at the open-end extremity of said U-shaped frame and engageable by said stop-engaging portion of said tuning element to limit the movement of said tuning element into said coil to a distance not exceeding approximately 30 per cent of the axial length of said coil.

5. A high-frequency resonant circuit continuously tunable over a frequency range comprising: a U-shaped supporting frame of conductive material; a plurality of turns of a flat conductive ribbon defining a cylindrical coil having a wall thickness corresponding to the thickness of said ribbon, disposed between the legs of said U-shaped frame with one end portion mechanically connected thereto for supporting said coil, and having an opposite end portion which is spaced from said frame by a distance at least equal to one-half of the diameter of said coil; a cylindrical tuning element of conductive material supported by said frame in coaxial alignment with said coil for movement into and out of said opposite end thereof to constitute therewith a variable condenser and including a stop-engaging portion projecting therefrom; and a stop element of dielectric material supported at the open-end extremity of said U-shaped frame and engageable by said stop-engaging portion of said tuning element to limit the movement of said tuning element into said coil to a distance not exceeding approximately 30 per cent of the axial length of said coil, said stop element including a portion mechanically connected to said opposite end of said coil to provide support therefor additional to that provided at said one end thereof.

6. A high-frequency resonant circuit continuously tunable over a frequency range comprising: a supporting frame of conductive material; a plurality of turns of a flat conductive ribbon defining a cylindrical coil having a wall thickness corresponding to the thickness of said ribbon, having one end portion mechanically connected to said frame for supporting said coil, and having an opposite end portion which is spaced from said frame by a distance equal to the diameter of said coil; a cylindrical tuning element of conductive material supported by said frame in coaxial alignment with said coil for movement into and out of said opposite end thereof to constitute therewith a variable condenser; and a stop element mechanically connected to said frame for engagement by said tuning element to limit the movement of said tuning element into said coil to a distance not exceeding approximately 30 per cent of the axial length of said coil.

7. A high-frequency resonant circuit continuously tunable over a frequency range comprising: an L-shaped supporting frame of conductive material; a plurality of turns of a flat conductive ribbon defining a cylindrical coil having a wall thickness corresponding to the thickness of said ribbon, disposed parallel to one leg of said L-shape frame with one end portion mechanically connected to the other leg thereof for supporting said coil, and having an opposite end portion which is spaced from said frame by a distance at least equal to one-half of the diameter of said coil; a cylindrical tuning element of conductive material supported by said frame in coaxial alignment with said coil for movement into and out of said opposite end thereof to constitute therewith a variable condenser; and a stop element mechanically connected to said frame and disposed for engagement by said tuning element to limit the movement of said tuning element into said coil to a distance not exceeding approximately 30 per cent of the axial length of said coil.

8. A high-frequency resonant circuit continuously tunable over a frequency range comprising: a shield structure of conductive material; a plurality of conductor turns defining a cylindrical coil having a wall thickness corresponding to the thickness of said conductor, supported within said shield structure with one of its ends spaced from said structure by a distance at least equal to one-half of the diameter of said coil; a cylindrical tuning element of conductive material supported by said shield structure in coaxial alignment with said coil for movement into and out of said one end thereof to constitute therewith a variable condenser; and a stop element disposed for engagement by said tuning element to limit the movement of said tuning element into said coil to a distance not exceeding approximately 30 percent of the axial length of said coil.

ARVID E. CHELGREN.

REFERENCES CITED

The following references are of record in the file of this patent:

UNITED STATES PATENTS

| Number | Name | Date |
|---|---|---|
| 2,394,391 | Martowicz | Feb. 5, 1946 |
| 2,403,349 | Dolberg | July 2, 1946 |